US012018448B2

(12) United States Patent
Duarte Trigo et al.

(10) Patent No.: US 12,018,448 B2
(45) Date of Patent: Jun. 25, 2024

(54) METHOD OF FORMING A WIND TURBINE FOUNDATION

(71) Applicant: Vestas Wind Systems A/S, Aarhus N. (DK)

(72) Inventors: Hugo Miguel Duarte Trigo, São Mamede de Infesta (PT); Azadeh Attari, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 300 days.

(21) Appl. No.: 17/620,912

(22) PCT Filed: Jun. 29, 2020

(86) PCT No.: PCT/DK2020/050198
§ 371 (c)(1),
(2) Date: Dec. 20, 2021

(87) PCT Pub. No.: WO2021/001004
PCT Pub. Date: Jan. 7, 2021

(65) Prior Publication Data
US 2022/0325493 A1 Oct. 13, 2022

(30) Foreign Application Priority Data

Jul. 4, 2019 (DK) .......................... PA 2019 70436

(51) Int. Cl.
*E02D 27/42* (2006.01)
*F03D 13/20* (2016.01)
(52) U.S. Cl.
CPC .......... *E02D 27/425* (2013.01); *F03D 13/20* (2016.05); *F03D 13/206* (2023.08); *F03D 13/22* (2016.05);
(Continued)

(58) Field of Classification Search
CPC ........ F03D 13/20; F03D 13/206; F03D 13/22; E02D 2250/0023; E02D 2600/30
(Continued)

(56) References Cited

U.S. PATENT DOCUMENTS 2,625,815 A * 1/1953 Black .................. E04H 12/2261
52/707
5,379,563 A * 1/1995 Tinsley .................. E02D 27/44
52/298
(Continued)

FOREIGN PATENT DOCUMENTS

CN 101514541 A 8/2009
CN 201628056 U 11/2010
(Continued)

OTHER PUBLICATIONS

Danish Patent and Trademark Office, Search and Examination Report in PA 2019 70436, Dec. 5, 2019.
(Continued)

*Primary Examiner* — Brent W Herring
(74) *Attorney, Agent, or Firm* — Wood Herron & Evans LLP

(57) ABSTRACT

A method of forming a foundation (26) of a wind turbine (10) including a tower (12) having a base tower section (24), comprising: mounting a levelling apparatus (56) to an anchor cage (30), the anchor cage (30) including a plurality of anchor bolts (36) extending between an upper flange (34) and a lower flange (38), the levelling apparatus (56) being arranged between the upper and the lower flanges (34, 38); arranging the anchor cage (30) in an excavation pit (94); directing a cementitious material into the excavation pit (94) so that the upper flange (34) becomes at least partially embedded within the first cementitious material; allowing the cementitious material to cure to form a rigid body (28, 90); actuating the levelling apparatus (56) to raise the upper
(Continued)

flange (34) from the rigid body (28, 90) into a levelled position; directing a grout material (32) into a space beneath the raised upper flange (34); and allowing the grout material (32) to cure to form a support layer. The invention extends to an anchor cage arrangement and a system for forming a wind turbine foundation.

20 Claims, 11 Drawing Sheets

(52) U.S. Cl.
CPC .............. *E02D 2250/0023* (2013.01); *E02D 2300/002* (2013.01); *E02D 2600/30* (2013.01); *Y02E 10/728* (2013.01)

(58) Field of Classification Search
USPC ................. 52/294, 295, 296, 297, 651.01
See application file for complete search history.

(56) References Cited

U.S. PATENT DOCUMENTS

| | | | | |
|---|---|---|---|---|
| 5,505,033 | A * | 4/1996 | Matsuo | E02D 27/42 52/169.9 |
| 5,533,835 | A * | 7/1996 | Angelette | E02D 27/42 405/229 |
| 5,826,387 | A * | 10/1998 | Henderson | E02D 27/42 405/251 |
| 6,142,710 | A * | 11/2000 | Holland, Jr. | E04G 23/065 405/230 |
| 6,672,023 | B2 * | 1/2004 | Henderson | E02D 27/42 52/297 |
| 7,614,200 | B2 * | 11/2009 | Wobben | E02D 27/42 52/741.14 |
| 7,618,217 | B2 * | 11/2009 | Henderson | E02D 27/12 52/294 |
| 8,001,733 | B2 * | 8/2011 | Chen | E04G 25/06 254/93 A |
| 9,322,396 | B2 * | 4/2016 | Coordes | E04H 12/34 |
| 10,676,889 | B2 * | 6/2020 | Corella | F03D 13/22 |
| 11,236,727 | B2 * | 2/2022 | Brohm | E02D 27/425 |
| 2001/0046415 | A1 * | 11/2001 | Rupiper | E02D 27/48 405/232 |
| 2011/0061321 | A1 * | 3/2011 | Phuly | F03D 13/22 52/297 |
| 2012/0047830 | A1 * | 3/2012 | Phuly | E02B 17/025 52/294 |
| 2012/0260592 | A1 * | 10/2012 | Wolf | F03D 13/22 52/698 |
| 2012/0304588 | A1 * | 12/2012 | von Ahn | F03D 80/70 52/745.17 |
| 2013/0255169 | A1 * | 10/2013 | Henderson | E02D 27/32 52/223.13 |
| 2017/0044734 | A1 * | 2/2017 | Øllgaard | E02D 27/425 |
| 2018/0355853 | A1 * | 12/2018 | Sandvad | E02D 27/425 |
| 2020/0149242 | A1 * | 5/2020 | Henderson | E02D 5/42 |
| 2020/0173421 | A1 * | 6/2020 | Garduno Estebanez | E02D 27/425 |

FOREIGN PATENT DOCUMENTS

| | | |
|---|---|---|
| CN | 202100018 U | 1/2012 |
| CN | 103624537 A | 3/2014 |
| CN | 203599840 U | 5/2014 |
| CN | 204510255 U | 7/2015 |
| CN | 206233204 U | 6/2017 |
| CN | 107761736 A | 3/2018 |
| CN | 207331736 U | 5/2018 |
| CN | 108474193 A | 8/2018 |
| CN | 208167781 U | 11/2018 |
| EP | 2664714 A1 | 11/2013 |
| EP | 2871289 A1 | 5/2015 |
| EP | 3394345 A1 | 10/2018 |
| JP | S6145027 A | 3/1986 |
| JP | H04315613 A | 11/1992 |
| JP | H0742164 A | 2/1995 |
| JP | 10860675 A | 3/1996 |
| JP | H08105423 A | 4/1996 |
| JP | H1046599 A | 2/1998 |
| JP | H10131291 A | 5/1998 |
| JP | 2001059226 A | 3/2001 |
| JP | 2002243093 A | 8/2002 |
| JP | 2005213904 A | 8/2005 |
| JP | 2019002167 A | 1/2019 |
| WO | 2008003749 A1 | 1/2008 |
| WO | 2017108043 A1 | 6/2017 |

OTHER PUBLICATIONS

European Patent Office, International Search Report and Written Opinion in PCT Application No. PCT/DK2020/050198, Sep. 23, 2020.

China National Intellectual Property Administration, Office Action issued in corresponding Chinese Patent Application No. 202080052216.6, dated Jan. 19, 2023, with English translation.

* cited by examiner

METHOD OF FORMING A WIND TURBINE FOUNDATION

TECHNICAL FIELD

Aspects of the invention relate to a method of forming a foundation of a wind turbine, and to an apparatus for forming such a wind turbine foundation.

BACKGROUND

Wind turbines are used to produce electrical energy by converting kinetic energy from the wind into electrical power. A horizontal-axis wind turbine generally includes a tower, a nacelle located at the apex of the tower, and a rotor having a plurality of blades and supported in the nacelle by a shaft. The shaft couples the rotor either directly or indirectly with a generator, which is housed inside the nacelle. Consequently, as wind forces the blades to rotate, electrical energy is produced by the generator.

Horizontal-axis wind turbines are typically anchored on land by securing a lower portion of the tower, such as a lower tower flange, to a foundation that extends into the ground. Conventional foundations include steel-reinforced concrete structures arranged within an excavation pit. The foundation structure includes a generally cylindrical steel anchor cage that is positioned centrally within the concrete. The anchor cage includes upper and lower annular steel flanges which, when the anchor cage is arranged in the ground, are arranged horizontally relative to the tower. The anchor cage further comprises a plurality of high-strength steel anchor bolts which extend vertically between the upper and lower flanges. A plurality of nuts are arranged to secure the upper and lower flanges in position along the length of the anchor bolts.

In conventional methods of forming a wind turbine foundation, the anchor cage is positioned within the excavation pit and concrete is then poured into the pit so that the anchor cage becomes embedded within the concrete. Once the poured concrete cures, the nuts are removed and the upper flange is lifted from an upper surface of the cured concrete body to expose an annular trough.

The upper flange of the anchor cage is raised to a levelled position by varying the degree to which the different sections of the upper flange is elevated above the upper surface of the concrete body.

Once the upper flange of the anchor cage is raised to the levelled position above the foundation body, high strength grout is then directed underneath the upper flange and into the trough, and is allowed to cure to form an annular grout support layer. The grout is filed up to a lower surface of the upper flange such that it forms a rigid support layer between the upper flange of the anchor cage and the steel-reinforced concrete body of the foundation.

Once the grout cures, the tower flange may then be positioned on top of the foundation, with or without the upper flange of the anchor cage remaining in place, to maintain the wind turbine in a levelled orientation.

The securing nuts are tightened onto the upper ends of the anchor bolts, thereby tensioning the anchor bolts and maintaining the foundation under heavy compression, which is advantageous for counteracting overturning moments exerted by the wind turbine during use. The grout support layer functions to maintain the wind turbine in a levelled orientation, and to transfer loads from the wind turbine tower to the foundation during operation. In that regard, it is desirable to form the grout support layer so as to define a level mounting plane at which the lower tower flange may be mounted to the foundation. The above approach is exemplified in European patent application no. EP3394345A1.

The above described levelling method, in which the upper flange of the anchor cage is used to define the level mounting plane, typically requires specialist levelling apparatus which is used to manually adjust the upper flange into the correct levelled position. The levelling apparatus is removed after the grout has cured enough for it to maintain the upper flange in its levelled position.

An alternative levelling approach is also described in EP 2 871 289 A1

In both methods described above, the tower installation cannot commence before the levelling apparatus has been removed and the grout has cured sufficiently to support the weight of the tower.

Accordingly, there is a need for improvements in methods for setting wind turbine foundations and levelling wind turbines.

SUMMARY OF THE INVENTION

Against this background, in a first aspect the embodiments of the invention provide a method of forming a foundation of a wind turbine including a tower having a base tower section, comprising: mounting a levelling apparatus to an anchor cage, the anchor cage including a plurality of anchor bolts extending between an upper flange and a lower flange, the levelling apparatus being arranged between the upper and the lower flanges; arranging the anchor cage in an excavation pit; directing a cementitious material into the excavation pit so that the upper flange becomes at least partially embedded within the first cementitious material; allowing the cementitious material to cure to form a rigid body; actuating the levelling apparatus to raise the upper flange from the rigid body into a levelled position; directing a grout material into a space beneath the raised upper flange; and allowing the grout material to cure to form a support layer.

The invention can also be expressed as an anchor cage arrangement for forming a wind turbine foundation, comprising: an upper flange, a lower flange, and a plurality of anchor bolts extending between the upper and lower flanges through a plurality of respective anchor bolt apertures; and a levelling apparatus arranged between the upper and the lower flanges, the levelling apparatus comprising a jacking body which is fixedly coupled to at least one anchor bolt and a jacking foot arranged to raise the upper flange away from the lower flange.

Furthermore, the invention can be expressed as a system for forming a wind turbine foundation comprising: at least one anchor cage arrangement as defined above, and an actuating tool configured to be inserted through a bore in the upper flange to engage with the levelling apparatus to raise the upper flange away from the lower flange.

There are numerous benefits conferred by the invention. Firstly, the levelling apparatus forms part of the anchor cage and is embedded in the foundation as the concrete is poured. This enables a shallow grout trench to be formed above the levelling apparatus, which in turn enables less grout to material to be used leading to reduced curing times. Secondly, since the levelling apparatus is in effect integral with the underlying body of the foundation, the upper flange is used in effect to "shape" the grout trench during the forming process. Therefore, when the levelling apparatus is used to raise the upper flange of the anchor cage, the grout trench is left as a relief form in the foundation body. Advantageously, therefore, the upper flange acts as a formwork, which means that additional formwork is not required, compared to known processes, thereby reducing cost and waste. A further benefit is that the base tower section is supportable on the upper flange before the grout material is poured. This reduces processing time compared to known approaches meaning that the tower erection process can be more efficient.

As discussed above, in some embodiments, following the actuation of the levelling apparatus, the base tower section may be supported on the upper flange of the anchor cage. This step may occur before or during the step of directing the grout material into the space beneath the upper flange. This provides flexibility in the process of forming the foundation and erecting the base tower section.

The step of directing the grout material into the space beneath the upper flange may comprise injecting the grout material through an aperture in the upper flange. This may be more convenient that alternative options such as directing grout material around the side of the upper flange, and the aperture or apertures may be positions in order to optimise relative spacing for grout delivery and curing. The second aperture may be in a position outside a region occupied by the base tower section that is supported on the upper flange. In this way, therefore, the presence of the base tower section on the upper flange does not prevent the grout material from being delivered to the grout trench.

In one elegant embodiment, the levelling apparatus may be actuated through engagement with a suitable tool, said tool being inserted through an aperture in the upper flange. More specifically, the operation of the levelling apparatus may involve engaging the actuating tool with a jacking foot of the levelling apparatus, and rotating the jacking foot with respect to the jacking body to raise the upper flange away from the jacking body.

Conveniently, the levelling apparatus may be mounted to the anchor cage via at least one anchor bolt. Preferably, the levelling apparatus is supported in position relative to the anchor bolt so relative movement is permitted. This allows the anchor bolts to be tensioned without affecting the levelling apparatus. Preferably, the levelling apparatus may be mounted to the at least one anchor bolt before installing at least one of the upper and lower flanges onto the at least one anchor bolt. The anchor bolts, flanges and levelling apparatus therefore form a single assembly that may be placed in the excavation pit for the foundation. In order to prevent the first cementitious material from fouling the operation of the levelling apparatus, the levelling apparatus may be arranged to abut an underside of the upper flange before directing the first cementitious material into the excavation pit.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The invention will now be described by way of example with reference to the accompanying drawings, in which.

DETAILED DESCRIPTION

The following detailed description refers to the accompanying drawings that show, by way of illustration, specific details and embodiments in which the invention may be practiced. These embodiments are described in sufficient detail to enable those of ordinary skill in the art to practice the invention. Other embodiments may be utilised, and structural changes may be made without departing from the scope of the invention as defined in the appended claims. As used herein, the term "level" means generally horizontal, and more particularly, generally orthogonal to the direction of gravitational force.

Figure 1:
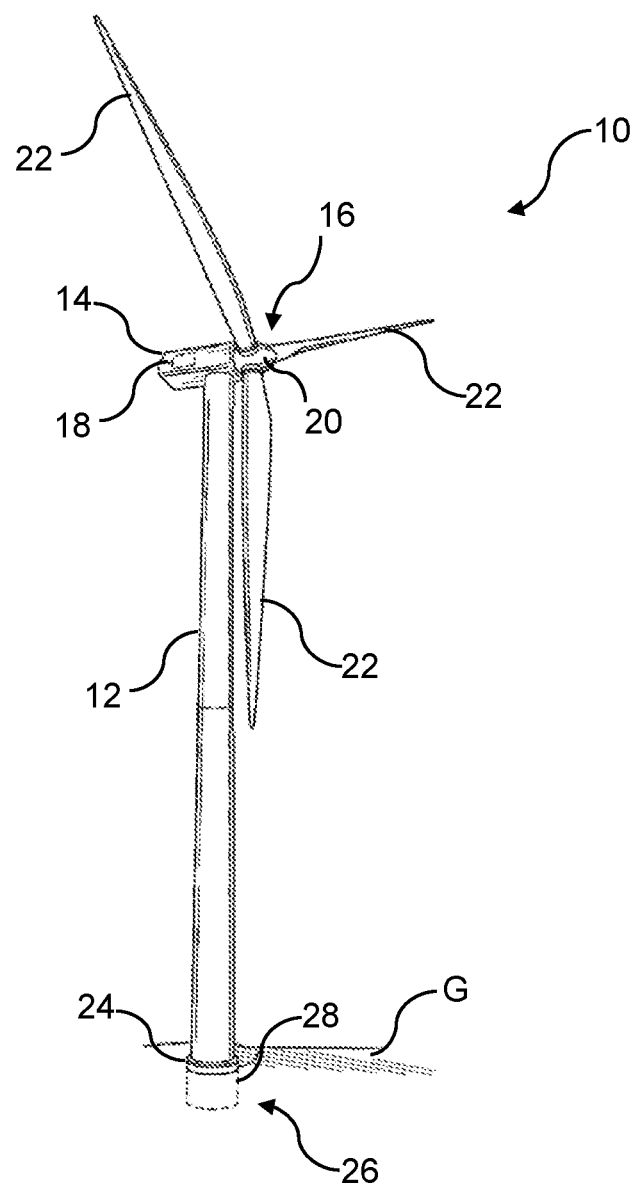
FIG. 1 is a perspective view of a wind turbine coupled to an exemplary foundation, shown schematically.

The present invention relates to a method of forming a foundation for a wind turbine generator, or more simply, wind turbine. It is desirable to provide a level mounting surface on which to install a wind turbine generator. An exemplary horizontal-axis wind turbine 10 is shown in FIG. 1, including a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10.

The tower 12 supports the load presented by the nacelle 14, the rotor 16, and other components of the wind turbine 10 that are housed inside the nacelle 14. The tower 12 further operates to elevate the nacelle 14 and rotor 16 to a height above ground level or sea level, as may be the case, at which faster moving air currents of lower turbulence are typically found.

The rotor 16 of the wind turbine 10 serves as the prime mover for the electromechanical system. Wind exceeding a minimum level will activate the rotor 16 and cause rotation in a substantially perpendicular direction to the wind direction. The rotor 16 of wind turbine 10 includes a central hub 20 and a plurality of blades 22 that project outwardly from the central hub 20 at locations circumferentially distributed thereabout.

While the exemplary rotor 16 shown herein includes three blades 22, various alternative quantities of blades may be provided. The blades 22 are configured to interact with the passing air flow to produce lift that causes the rotor 16 to spin generally within a plane defined by the blades 22.

The wind turbine 10 may be included among a collection of similar wind turbines belonging to a wind farm or wind park that serves as a power generating plant connected by transmission lines with a power grid, such as a three-phase alternating current (AC) power grid.

The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

The wind turbine 10 is anchored to a ground surface G by securing a base tower section 24 of the wind turbine tower 12 to a foundation 26, shown schematically in FIG. 1. The foundation 26 comprises a rigid body 28 which is recessed in an excavation pit, or cavity, formed in the ground G. The foundation 26 and the method of forming the formation are described in greater detail below according to exemplary embodiments of the invention.

Figure 2:
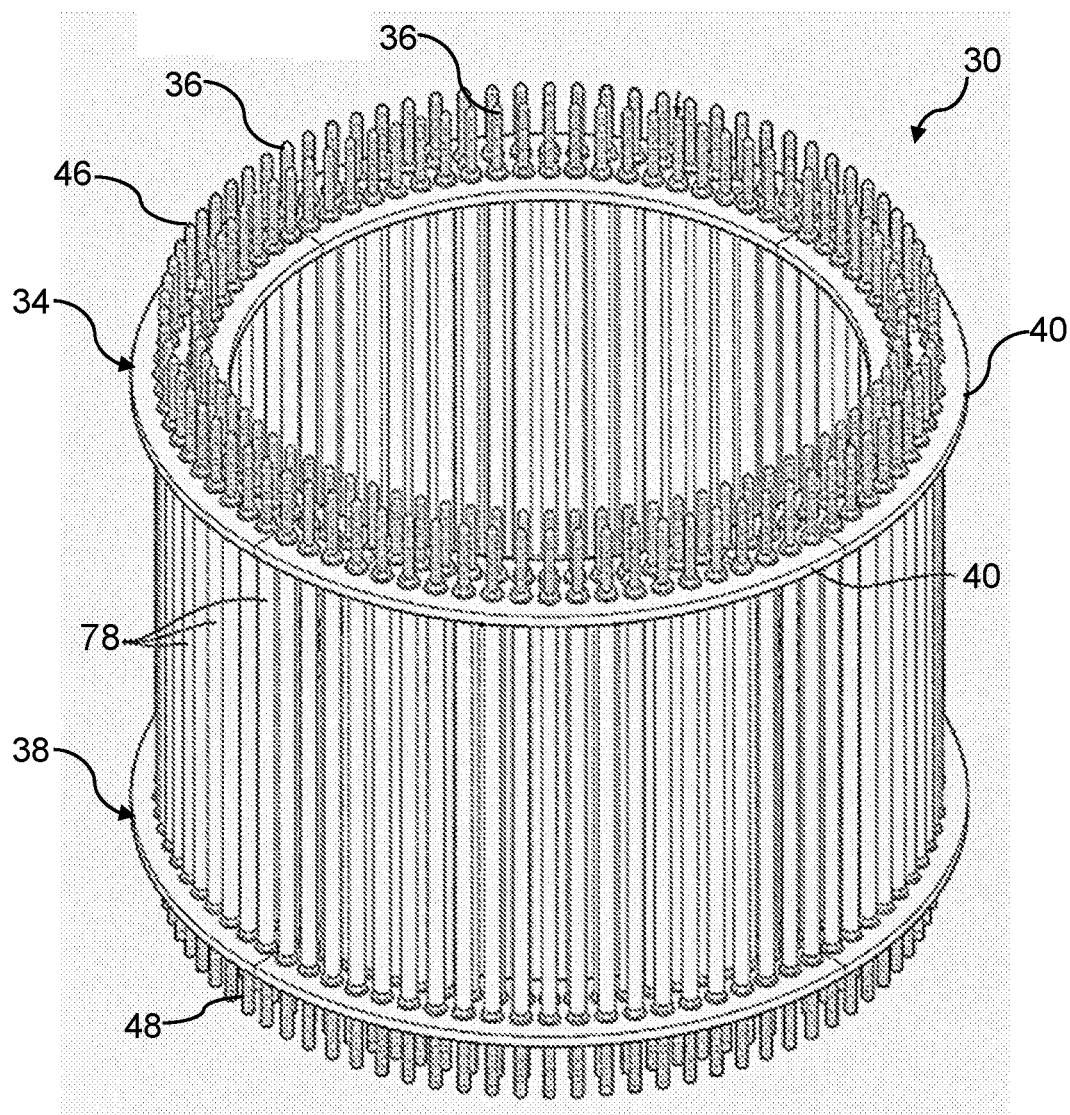
FIG. 2 a perspective view of an anchor cage for use with a wind turbine foundation according to an exemplary embodiment of the invention.
Figure 3:
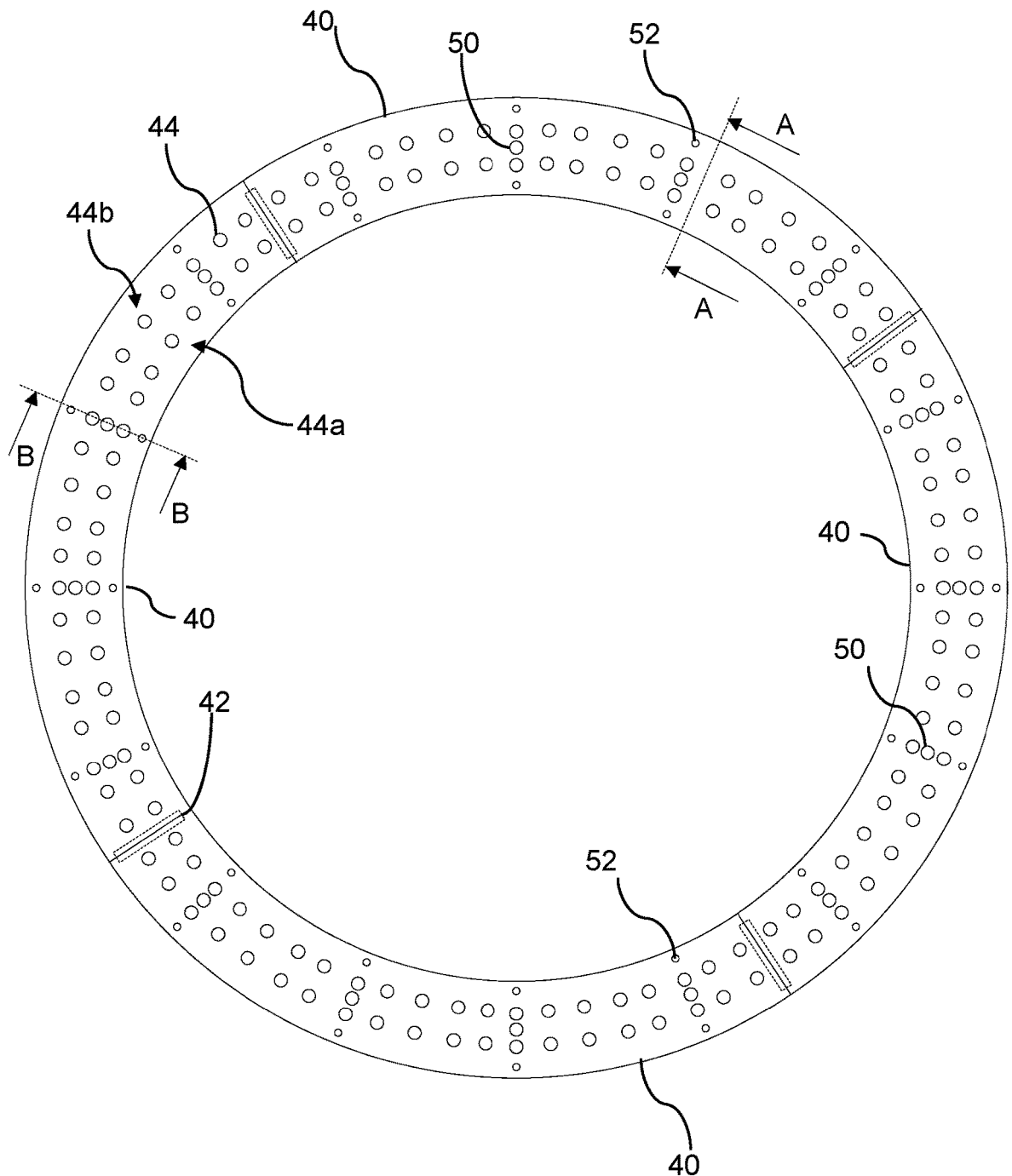
FIG. 3 is a top view of an upper load distribution flange of the anchor cage of FIG. 2.

With reference to the FIGS. 2 and 3, the foundation 26 includes an anchor cage 30 at least partially embedded within and reinforcing the rigid body 28. The anchor cage 30 is generally cylindrical and comprises an upper load distribution flange 34, a lower base flange 38, and a plurality of circumferentially spaced anchor bolts 36, or support rods, extending between the upper load distribution flange 34 and the base flange 38. The upper load distribution flange 34 and the base flange 38 are herein referred to as the upper flange 34 and the lower flange 38, respectively.

Figure 12:
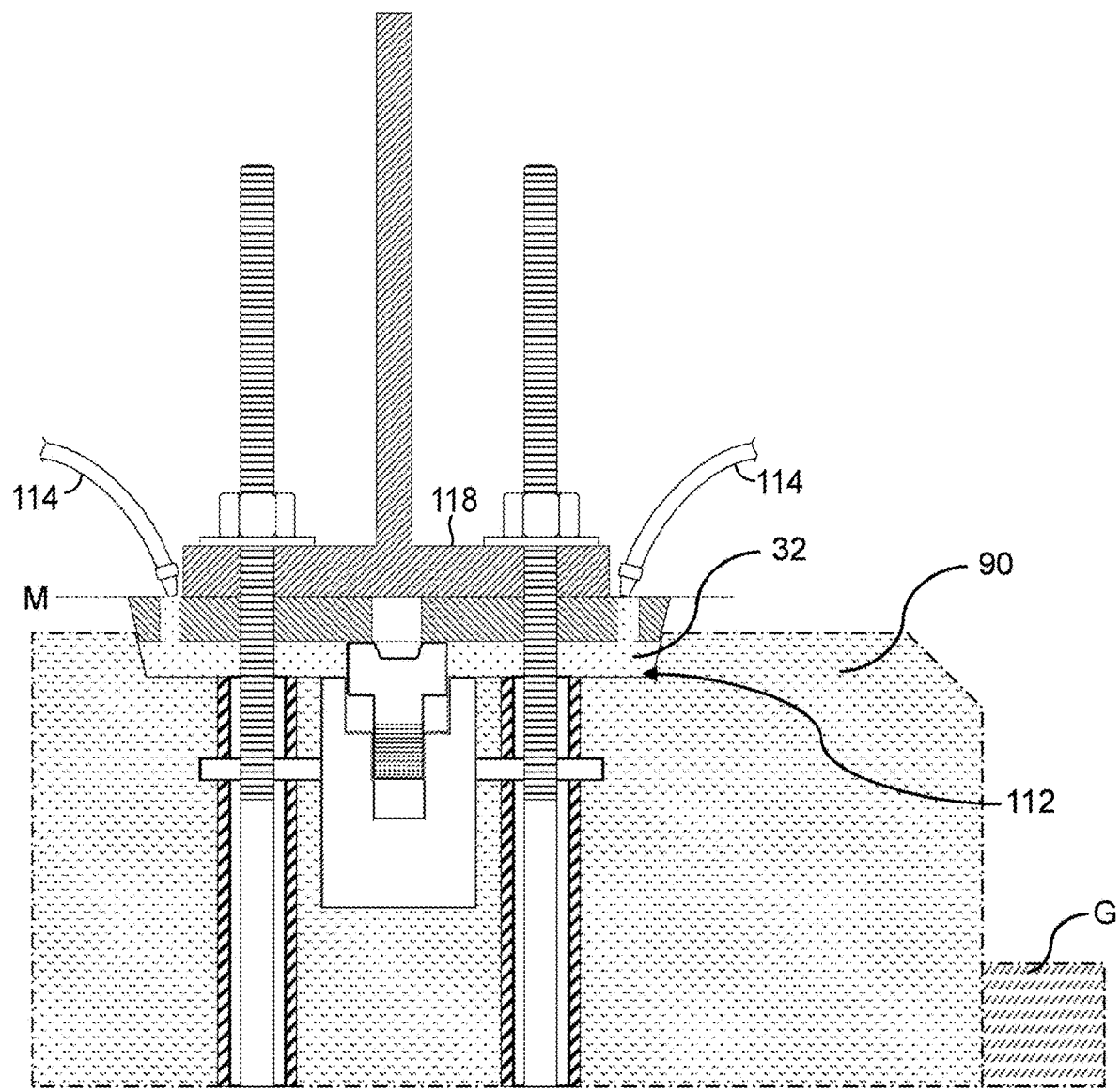
FIG. 12 is an upper radial cross-sectional view similar to FIG. 11, showing delivery of grout into the trough through the load distribution flange, the load distribution flange supporting the base tower section of the wind turbine.

The rigid body 28 is formed of a first cementitious material which has been poured into the excavation pit and then allowed to cure. The foundation 26 further comprises a grout support layer 32, as shown in FIG. 12, which is arranged between the upper flange 34 of the anchor cage 30 and an upper surface of the rigid body 28. As will be explained in more detail below, the grout support layer 32 is formed of a second cementitious material which is directed beneath the upper flange 34, during the formation of the foundation 26, and is thereby arranged to support the load distribution flange 34 in a raised position relative to the rigid body 28.

During construction of the wind turbine 10, the base tower section 24 of the wind turbine is coupled to the anchor bolts 36 of the anchor cage 30 and is directly supported by the load distribution flange 34, which in turn is supported in a level position by the grout support layer 32. The exemplary embodiments of the invention described herein provide features and methods for levelling the load distribution flange 34 of the anchor cage 30 so that the wind turbine 10 may be anchored in a level and stable orientation.

Returning to FIG. 2, the upper flange 34 and the lower flange 38 are arranged generally horizontally, while the anchor bolts 36 extend generally vertically and couple the upper flange 34 to the lower flange 38. The upper flange 34 and lower flange 38 may be generally circular, and in particular annular, for example. The components of the anchor cage 30 may be formed of high strength steel, for example. It should be noted that the terms 'horizontal' and 'vertical' are used here in the sense of the conventional reference frame of an anchor cage in use. Generally, however, the anchor rods extend in a direction that is perpendicular to the plane of the upper and lower flanges.

The upper flange 34 is constructed from a plurality of independently formed arcuate segments 40 coupled together at their ends using tie plates 42, shown schematically in FIG. 3, or using any other suitable mechanical fastening elements.

In some embodiments the upper and/or lower flanges are constructed as a one-piece annular ring.

The exemplary upper flange 34 shown in FIG. 3 includes four arcuate segments 40, each forming an approximately 90 degree circumferential portion or arc of the upper flange 34, though it will be appreciated that the upper flange 34 be constructed of more or fewer arcuate segments of various circumferential sizes in alternative embodiments. In an exemplary alternative embodiment, the upper flange 34 may be formed as a single integral component that does not include multiple independently formed arcuate segments.

The modular nature of the anchor cage 30 enables the efficient transportation of the anchor cage components to the wind turbine installation site. To construct the anchor cage 30, each arcuate segment 40 of the upper flange 34 is coupled to a corresponding arcuate segment 40 of the lower flange 38 using a corresponding plurality of anchor bolts 36, thereby forming a circumferential portion of the anchor cage 30.

The anchor cage shown on FIG. 2 through FIG. 12 are all adapted to a tower with a T-flange at its bottom end. The T-flange has bolt holes inside and outside the tower wall.

In alternative embodiments the tower may have an L-flange at its bottom end, where bolt holes are only located on the inside or outside of the tower wall.

Returning to the embodiment in FIG. 2, the upper flange 34 is provided with a plurality of circumferentially spaced bolt through bores or holes 44 through which the threaded upper ends 46 of the anchor bolts 36 are received. The lower flange 38 includes a corresponding plurality of bolt holes 44 through which threaded lower ends 48 of the anchor bolts 36 are received. The bolt holes 44 are arranged into a radially inner ring 44a for receiving a radially inner ring of the anchor bolts 36, and a radially outer ring 44b for receiving a radially outer ring of the anchor bolts 36.

As is best shown in FIG. 3, the inner and outer rings 44a, 44b are radially aligned with one another such that the bolt holes 44 and respective anchor bolts 36 are arranged into circumferential spaced radial pairs. The bolt holes 44 are uniformly spaced circumferentially such that each of the arcuate segments 40 includes an equal quantity of bolt holes 44. In exemplary embodiments, the anchor cage 30 may include approximately 64 to 144 radial pairs of anchor bolts 36 and corresponding bolt holes 44 formed on each of the upper flange 34 and lower flange 38.

In the illustrated exemplary embodiment shown in FIGS. 2 and 3, the anchor cage 30 includes eighty radial pairs of anchor bolts 36, such that each arcuate segment 40 of the upper flange 34 and lower flange 38 includes twenty radial pairs of bolt holes 44. It will be appreciated that various other suitable arrangements of anchor bolts 36 and bolt holes 44 may be provided and/or arranged in alternative configurations without departing from the present invention.

In embodiments adapted for towers with an L-flange at its bottom end, the bolt holes will be arranged in a single radially inner- or outer ring.

The upper flange 34 further includes a plurality of circumferentially spaced levelling elements, shown in the form of levelling through-bores, apertures or holes 50, that facilitate the levelling process described below.

Each of the levelling holes 50 defines a respective levelling location on the upper flange 34. While shown in the form of circular holes 50, the levelling elements may take various alternative forms suitable for engaging the exemplary levelling apparatus 82 described below.

With particular reference to FIG. 2, each levelling hole 50 is arranged between a radially inner and outer ring 44a, 44b of the bolt holes 44, and is provided with uniform circumferential spacing such that each arcuate segment 40 of the upper flange 34 includes an equal quantity of levelling holes 50.

In embodiments adapted for towers with an L-flange at its bottom end, the levelling holes may be arranged between adjacent bolt holes in the single radially inner- or outer ring, or in a separate central ring in the middle of the upper flange.

In the illustrated exemplary embodiment, the upper flange 34 includes sixteen levelling holes 50 uniformly spaced such that each arcuate segment 40 of the upper flange 34 includes four levelling holes 50. However, it will be appreciated that various alternative quantities and configurations of levelling holes 50 may be provided, without departing from the scope of the present invention.

The upper flange 34 further includes a plurality of circumferentially spaced grouting through-bores, apertures or holes 52 through which grout, or other suitable cementitious materials, may be directed during formation of the grout support layer 32, as described in greater detail below. Accordingly, each grouting hole 52 defines a respective grouting location on the upper flange 34.

In the illustrated exemplary embodiment, each levelling position of the upper flange 34 is provided with two grouting holes 52. Each pair of grouting holes 52 are arranged radially either side of the corresponding inner and outer bolt holes 44a, 44b. The grouting holes 52 are provided with uniform circumferential spacing such that each arcuate segment 40 of the upper flange 34 includes an equal quantity of grouting holes 52.

The grouting holes 52 are positioned radially such that they are free of the tower flange when the tower is in position on the upper flange.

As shown in FIG. 3, the upper flange 34 includes four pairs of grouting holes 52 uniformly spaced such that each arcuate segment 40 of the upper flange 34 has eight grouting holes 52. However, various alternative configurations of grouting holes 52 may be provided.

In embodiments adapted for towers with an L-flange at its bottom end, the grouting holes may also be arranged as in the embodiment described in FIG. 3 and its alternatives.

As shown best in FIG. 3, the levelling holes 50 and grouting holes 52 are positioned in radial alignment with the same radial pair of bolt holes 44. In alternative exemplary arrangements, the levelling and grouting holes 50, 52 may each be aligned with a different radial pair of bolt holes 44. Alternatively, each of the levelling and grouting holes 50, 52 may be positioned so that they are circumferentially offset from the radial pair of bolt holes 44. According to such an arrangement, each levelling hole 50 may be arranged between two adjacent radial pairs of bolt holes 44.

In the exemplary load distribution flange 34 shown in FIG. 3, the grouting holes 52 are shown as having a smaller diameter than both the levelling holes 50 and the bolt holes 44. However, it will be appreciated that the grouting bores 52 may be configured with any suitable dimensions, so long as they allow for cementitious material to be directed beneath the upper flange 34 during the anchor cage levelling process, as described in more detail below.

Figure 4:
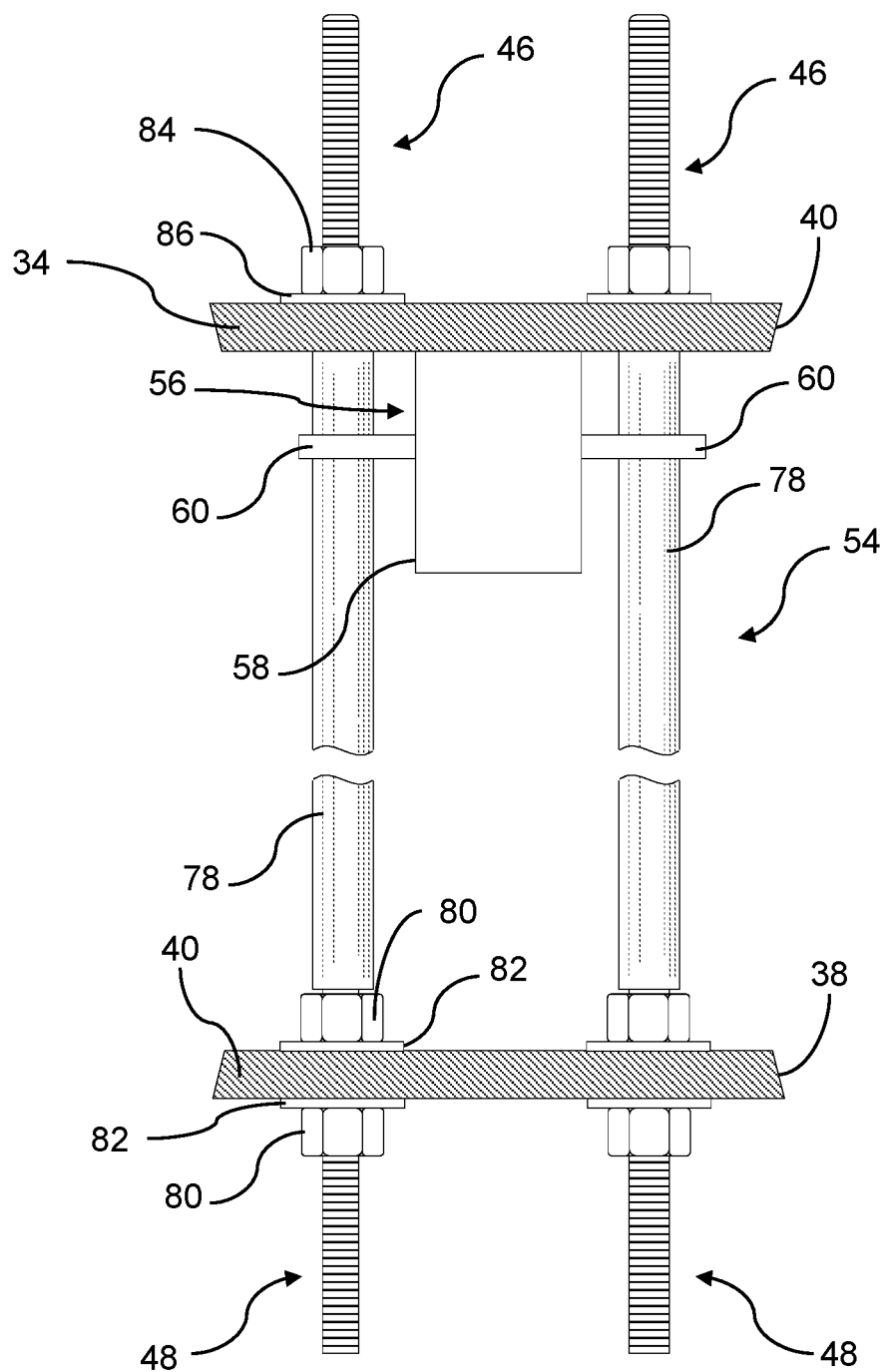
FIG. 4 is a radial cross-sectional view, taken along line A-A as shown in FIG. 3, of the anchor cage of FIG. 2 showing a levelling apparatus arranged between a pair of support rods.

Referring to FIG. 4, which is a cross-sectional view of the anchor cage 30 taken along line A-A as shown in FIG. 3, further details of the anchor cage 30 will now be described. In particular, FIG. 4 shows a radial pair of anchor bolts 36 extending between respective arcuate segments 40 of the upper and lower flanges 34, 38 of the anchor cage portion.

Each anchor bolt 36 extends longitudinally between the upper and lower flanges 34, 38 and includes an upper end 46, a lower end 48, and a central portion 54. The anchor bolts 36 are threaded such that they can engage with various elements of the anchor cage 30. The central portion 54 is encased within a protective tube 78, such as a PVC pipe or a heat shrink hose, for example.

A subset of protective tubes 78 for the anchor cage 30 may be formed of a material having a high compressive strength suitable for load bearing applications, such as steel, for example, such that the anchor bolts 36 may be tensioned slightly to maintain the shape of the anchor cage 30 during transportation, handling and lifting.

Additionally, each protective tube 78 is formed with an outer diameter that is larger than the diameters of the bolt holes 44 formed in the load distribution flange 34 and the base flange 38. In this way, the protective tubes 78 provide the further function of supporting the weight of the upper flange 34 and ensuring that a uniform spacing between the upper and lower flanges 34, 38 is substantially maintained prior to the addition of cementitious material, as described below.

The upper end 46 of each anchor bolt 36 is also sealed with a protective covering, such as tape or a heat shrink hose, which is applied prior to assembling the anchor bolts 36 with the upper flange 34 and the lower flange 38.

The protective tubes and coverings are configured to shield the anchor bolts 36 from undesired contact and bonding with cementitious material during the formation of the foundation 26, as described in more detail below. In alternative embodiments, the protective tubing 78 may be dispensed with and instead the central portion 54 may be treated by any other suitably protective means, as will be readily understood by the skilled person.

During assembly of the anchor cage 30, the lower end 48 of the anchor bolt 36 is passed through a bolt hole 44 of the arcuate segment 40 of the base flange 38, and is secured thereto using lower flange nut 80 and lower flange washers 82 that clamp the arcuate segment 40 therebetween. The threaded upper end 46 of the anchor bolt 36 is passed through a corresponding bolt hole 44 of the arcuate segment 40 of the upper flange 34, and is secured thereto using an upper flange nut 84 and an upper flange washer 86.

With reference to FIG. 4, a levelling apparatus 56 is arranged between the upper and lower flanges 34, 38 of the anchor cage 30. The levelling apparatus 56 is mounted to the radial pair of anchor bolts 36 and is configured to raise the upper flange 34 away from the lower flange 38, when in use. The levelling apparatus 56 in this embodiment takes the form of a screw jack, and as such comprises a cylindrical jacking body 58, which is fixedly coupled by a pair of support arms 60 to the radial anchor bolts 36.

Figure 5:
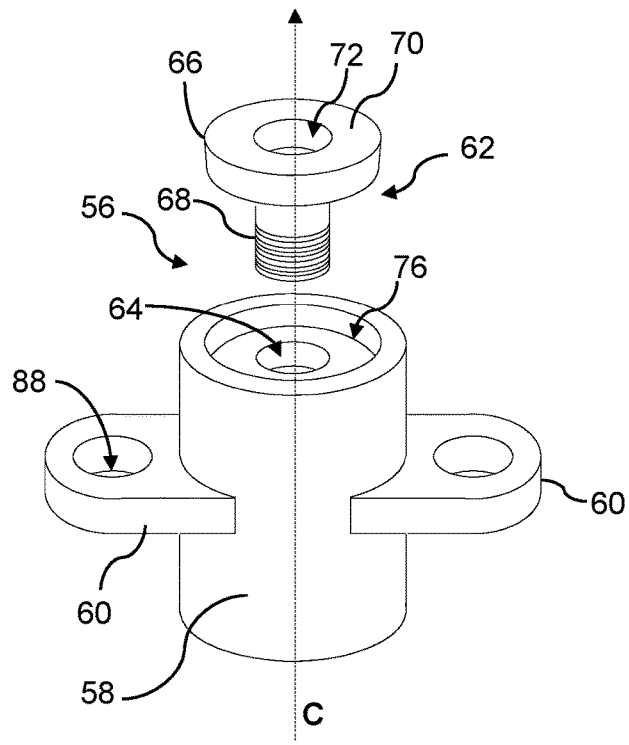
FIGS. 5, 6 and 7 are perspective views of the levelling apparatus according to an exemplary embodiment of the invention, for use with the anchor cage of FIG. 2, showing a jacking foot at different stages of insertion within a jacking body of the levelling apparatus.
Figure 6:
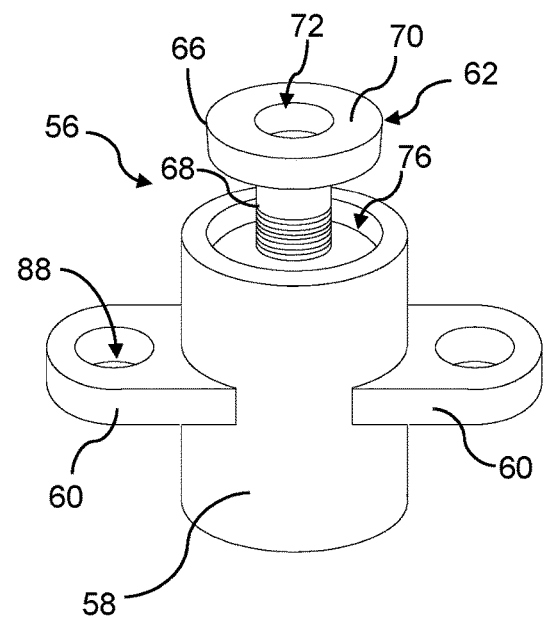
Figure 7:
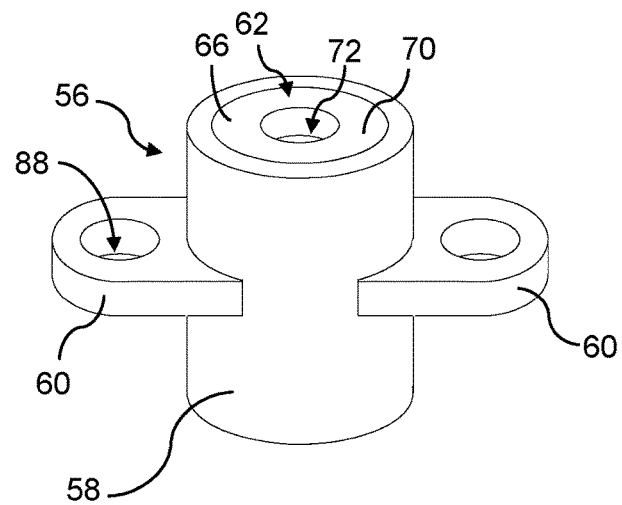

The jacking body 58 comprises a cylindrical housing having a longitudinal axis C which is aligned vertically with the anchor bolts 36, when the levelling apparatus 56 is mounted to the anchor cage 30. The support arms 60 extend radially from the sides of the jacking body 58, as is shown in FIGS. 5, 6 and 7. Accordingly, the support arms 60 are arranged so that, once the levelling apparatus 56 is mounted to the anchor cage 30, they extend horizontally from either side of the jacking body 58 to engage with the radial pair of anchor bolts 36, as shown in FIG. 4.

The levelling apparatus 56 further comprises a jacking point, pad or foot 62 which is threadedly engaged with a threaded bore 64 of the jacking body 58, as is best illustrated in FIGS. 5 and 6. The jacking foot 62 comprises an upper head portion 66 and a lower threaded portion 68. The head portion 66 has a substantially flat circular upper surface 70 which is arranged to engage with the underside of the upper flange 34 of the anchor cage 30 when the levelling apparatus 56 is mounted to the anchor cage 30. As will be apparent, the jacking foot is used to adjust the position of the upper flange and so may also be referred to as an adjustment pad.

The threaded portion 68 of the jacking foot 62 is configured to threadedly engage with the threaded bore 64 of the jacking body 58 so as to allow the jacking foot 62 to be rotatably adjusted relative to the jacking body 58. During operation of the levelling apparatus 56, the jacking foot 62 is deployed from a retracted position, as shown in FIG. 7, to an elevated, or extended, position, as shown in FIG. 6.

It should be noted that the levelling apparatus 56 is provided with means for retaining it in position relative to the upper flange before concrete is poured into the excavation pit. In the illustrated embodiment, the support arms 60 serve to position the levelling apparatus 56 with respect to the anchor bolts 36 in a sliding relationship. With reference to FIGS. 5, 6 and 7, each support arm 60 is provided with an aperture or hole 88 which receives a respective anchor bolt 36. During assembly of the anchor cage 30, each support arm 60 inserted over its respective anchor bolt 36 before at least one of the upper and lower flanges 34, 38 is mounted in position. Although relative engagement between the levelling apparatus and respective anchor bolts is shown here, suitable means may be provided to fix the levelling apparatus in position. For example, a fastener may extend from the upper flange and attach to the jacking body 58 or the jacking foot 62.

The support provided to the levelling apparatus 56 is configured to maintain the position of the levelling apparatus 56 during the formation of the foundation 26. In particular, the support may be configured to secure the levelling apparatus 56 in position so that an upper face of the jacking body 58 remains in contact with the upper flange 34 whilst the cementitious material is being poured into the excavation pit. This prevents the cementitious material from flowing between the upper flange 34 and the levelling apparatus 56, where it could otherwise disrupt the operation of the levelling apparatus 56.

Once the rigid body 90 has formed, it encapsulates and therefore provides support to the levelling apparatus 56, which thereby enables the jacking foot 62 to exert a levelling force upon the upper flange 34 during the anchor cage levelling process.

The upper end of the jacking body 58 comprises a recessed portion 76 in the form of a counterbore arranged to receive the jacking foot 62 when the jacking foot 62 is arranged in its retracted position, as shown in FIG. 7. The recessed portion 76 is dimensioned to provide a tight fit around the head portion 66 of the jacking foot 62 when it is arranged therein, so as to prevent any ingress of cementitious material during the pouring process, and that so the upper face of the head portion 66 lies flush with the surrounding part of the jacking foot 62. An option here would be for the upper end of the jacking body 58 to be configured so that it can form a seal with the underside of the upper flange. Correspondingly, the head portion 66 could be configured so that it sits below the upper end of the jacking body 58, such a configuration usefully allowing for manufacturing tolerances.

In the illustrated embodiment, therefore, the recessed portion 76 of the jacking body 58 thereby helps to ensure that the jacking foot 62 can be deployed during the levelling process. The jacking foot 62 may be sealed with a protective covering, or lubricant, in order to help prevent undesired contact and bonding with cementitious material during the formation of the foundation 26. Also, as mentioned above, to avoid problems with ingress of cementitious material around the jacking body 58 and jacking foot 62, it is preferred that one or both components are configured to as to create a seal against the underside of the upper flange. Such a seal may be achieved by these components simply pressing up against the underside of the upper flange.

According to the exemplary embodiment of the levelling apparatus 56 shown in FIGS. 5, 6 and 7, both the jacking foot 62 and the jacking body 58 have substantially circular cross sections. It will be appreciated, however, that jacking foot 62 may be configured with any suitable shape which enables it to exert a levelling force upon the upper flange 34 of the anchor cage 30. Furthermore, the jacking body 58 may also comprise any shape which can suitably support an elevating element, such as the jacking foot 62, and which can be arranged between the upper and lower flanges 34, 38, and be mounted to at least one anchor rod 36 of the anchor cage 30.

The circumferential portion of the anchor cage 30 comprising a levelling apparatus 56, as shown in FIG. 4, defines an anchor cage arrangement 92 according to an embodiment of the present invention. FIGS. 8 to 12 show a cross sectional view of such an anchor cage arrangement 92, taken along line B-B as shown in FIG. 3, during successive stages of the foundation 26 forming process. It will be understood that the levelling steps described below may be similarly performed at each of the other levelling locations defined by the other levelling bores 50 arranged around the upper flange 34 of the anchor cage 30.

Figure 10:
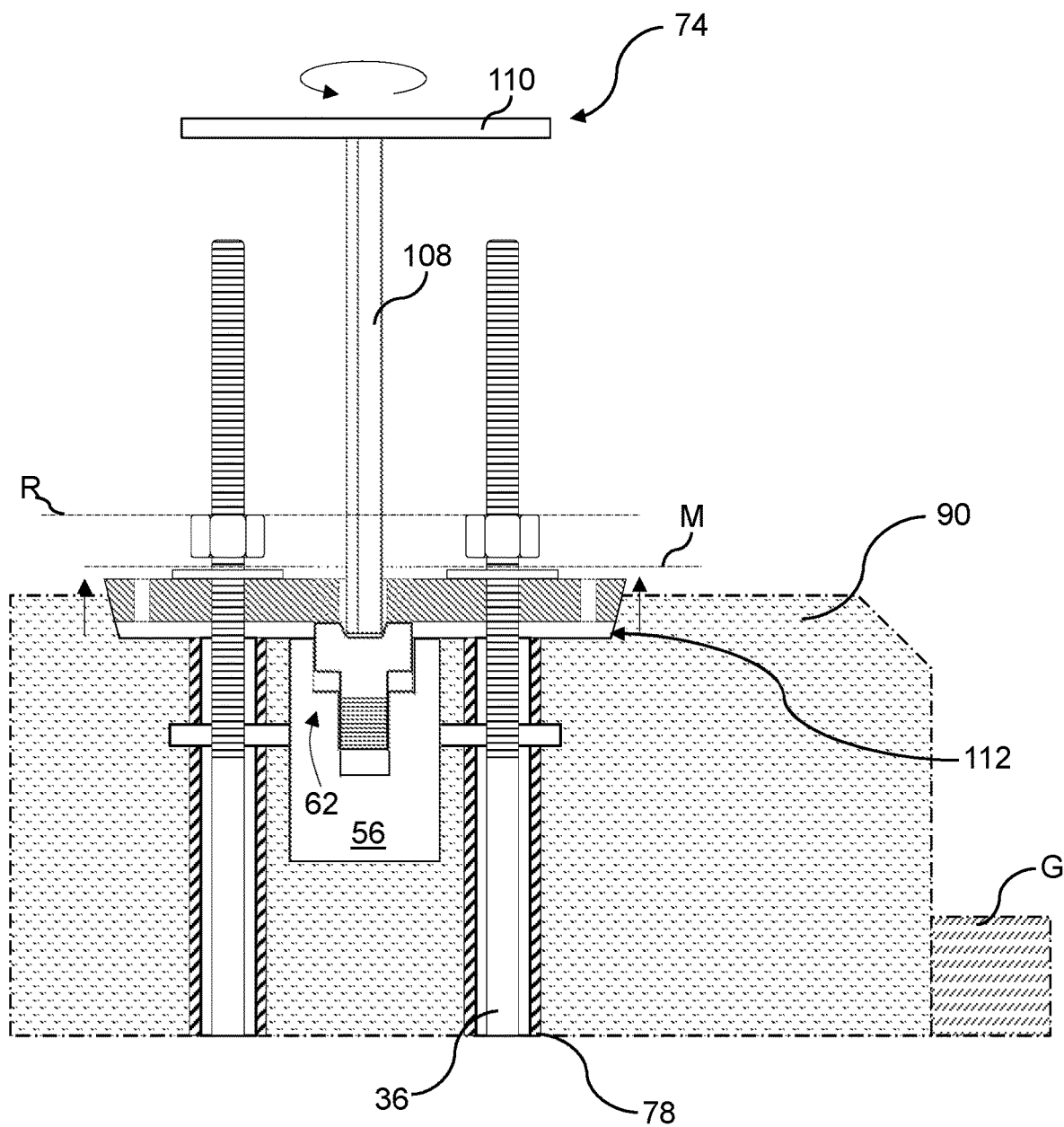
FIG. 10 is an upper radial cross-sectional view similar to FIG. 9, showing an actuating tool operating the levelling apparatus to raise the load distribution flange to a levelled position.

The levelling apparatus 56 is arranged such that a recessed portion or 'socket' 72 of the upper surface 70 of the jacking foot 62 is aligned with the levelling bore 50 of the upper flange 34. The recessed portion 72 is arranged to receive an actuating tool 74, as shown in FIG. 10, which is arranged to rotatably engage the jacking foot 62, relative to the jacking body 58, thereby actuating the jacking foot 62 between its retracted and extended positions to raise the upper flange 34 into a raised position.

Figure 11:
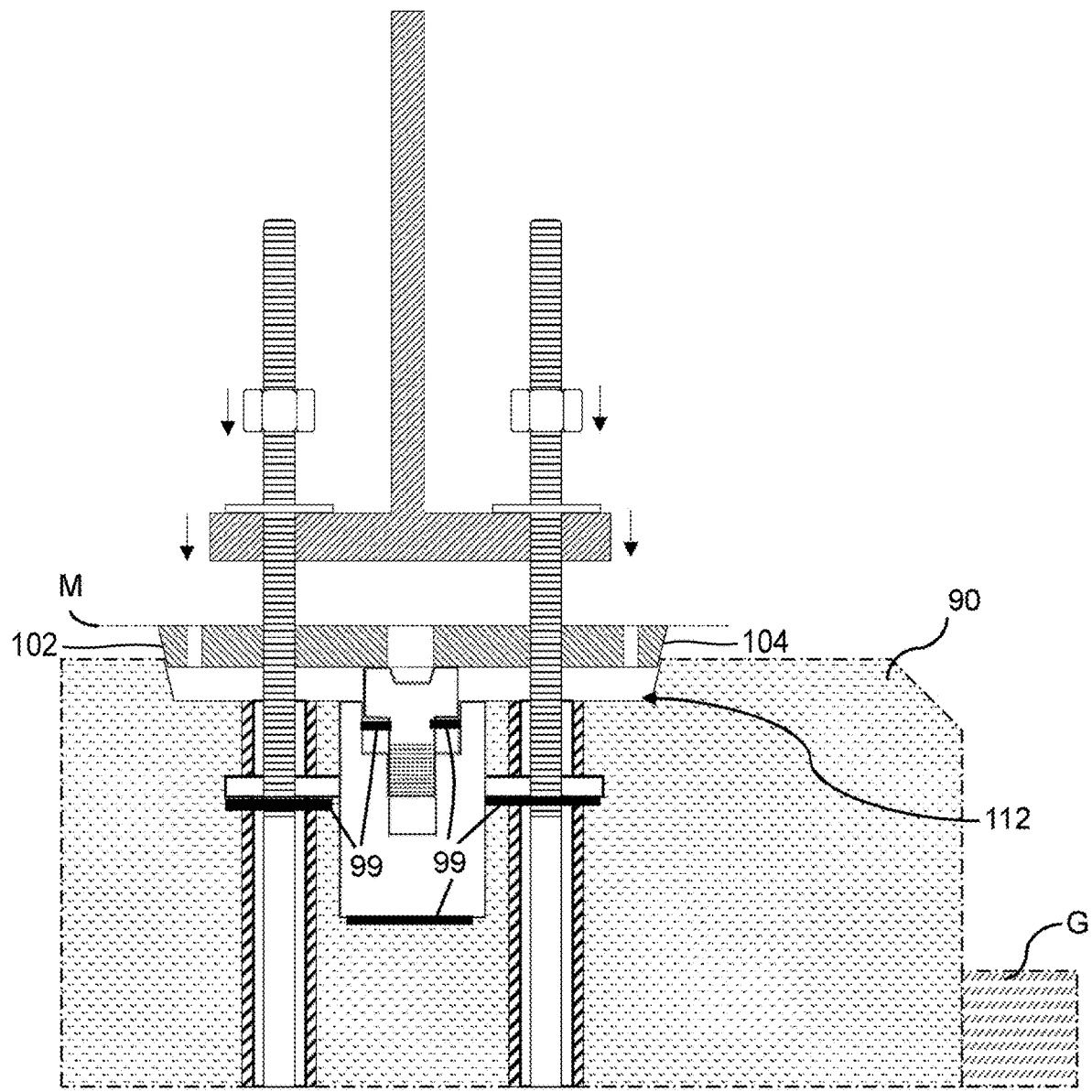
FIG. 11 is an upper radial cross-sectional view similar to FIG. 10, showing the load distribution flange raised to the levelled position to expose an underlying trough and a base tower section of the wind turbine being arranged on top of the load distribution flange.

Accordingly, the alignment of the jacking foot 62 with the levelling bore 50 allows the actuator tool 74 to engage the jacking foot 62 through the upper flange 34 during the anchor cage 30 levelling process. The jacking foot 62 is thereby actively deployed from the jacking body 58 in order to raise the upper flange 34 away from the lower flange 38, and into a levelled position, as shown in FIG. 11.

The jacking foot 62 is not fixedly attached to the upper flange 34. Instead, the upper surface of the jacking foot 62 has a diameter which is greater than the diameter of the levelling bore 50, which allows the jacking foot 62 to be seated against the underside of the upper flange 34. The jacking foot 62 is thereby arranged to apply a levelling force, in an upwardly direction, to the underside of the upper flange 34 in order to raise the upper flange 34 to a levelled position, as shown in FIG. 10.

The jacking foot 62 is aligned with the longitudinal axis C of the jacking body 58 such that the forces applied by the jacking foot 62 to the upper flange 34 are aligned with the jacking body 58, which helps to maintain the stability of the levelling apparatus 56 during the levelling process.

A method of forming the foundation 26, including steps for raising the upper flange 34 into a levelled position, will now be described with reference to FIG. 13 which expresses an embodiment of the invention as a series of method steps, together with FIGS. 8 to 12, as have been discussed above.

It is desirable to position the upper flange 34 in a levelled orientation in order to provide a level mounting surface for the wind turbine 10 during installation. It's also desirable to provide a grout support layer 32 between the upper flange 34 and the rigid body 28 in order to facilitate load transfer from the wind turbine 10 to the foundation 26, while maintaining a rigid metal-to-metal interface between the foundation 26, via the upper flange 34, and the wind turbine 10. The exemplary embodiments of the invention described below provide steps and components for achieving these objectives.

Figure 13:
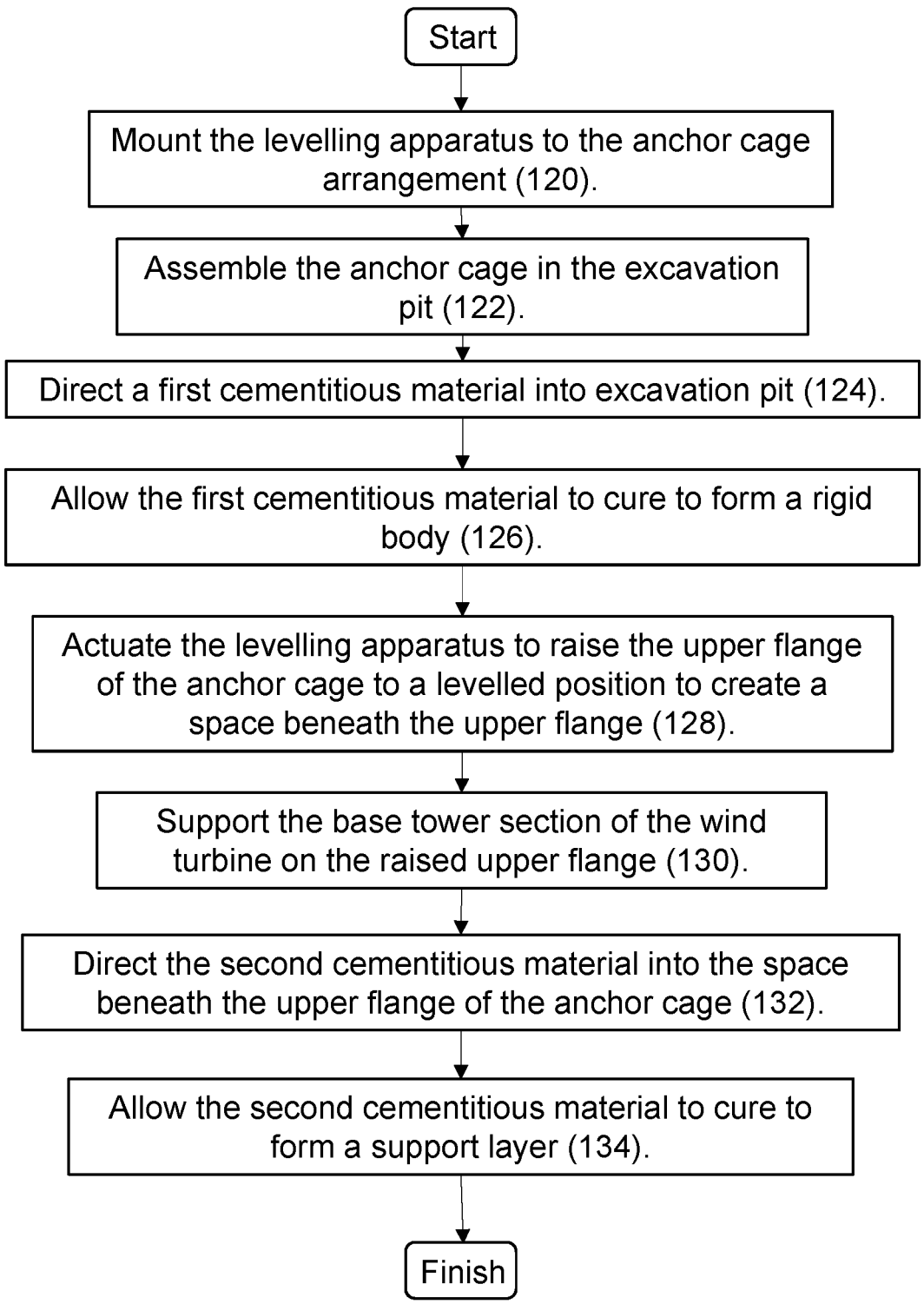
FIG. 13 is a flow chart that illustrates a method of forming a wind turbine foundation according to an exemplary embodiment of the invention.

Formation of the foundation 26 begins with the assembly of the anchor cage 30, which may be performed at the wind turbine installation site, whereby levelling apparatus 56 is mounted to the anchor cage (FIG. 13—step 120). The circumferential portions of the anchor cage 30 are assembled and then lowered into the excavation pit 94. The separate sections are then joined together using the tie plates 42 to form the completed anchor cage 30. Final positional adjustments of the assembled anchor cage 30 may be made to ensure generally central positioning within the excavation pit 94 (FIG. 13 step 122). The exaction pit may be lined with a formwork for defining an outer side surface of the foundation 26.

Figure 8:
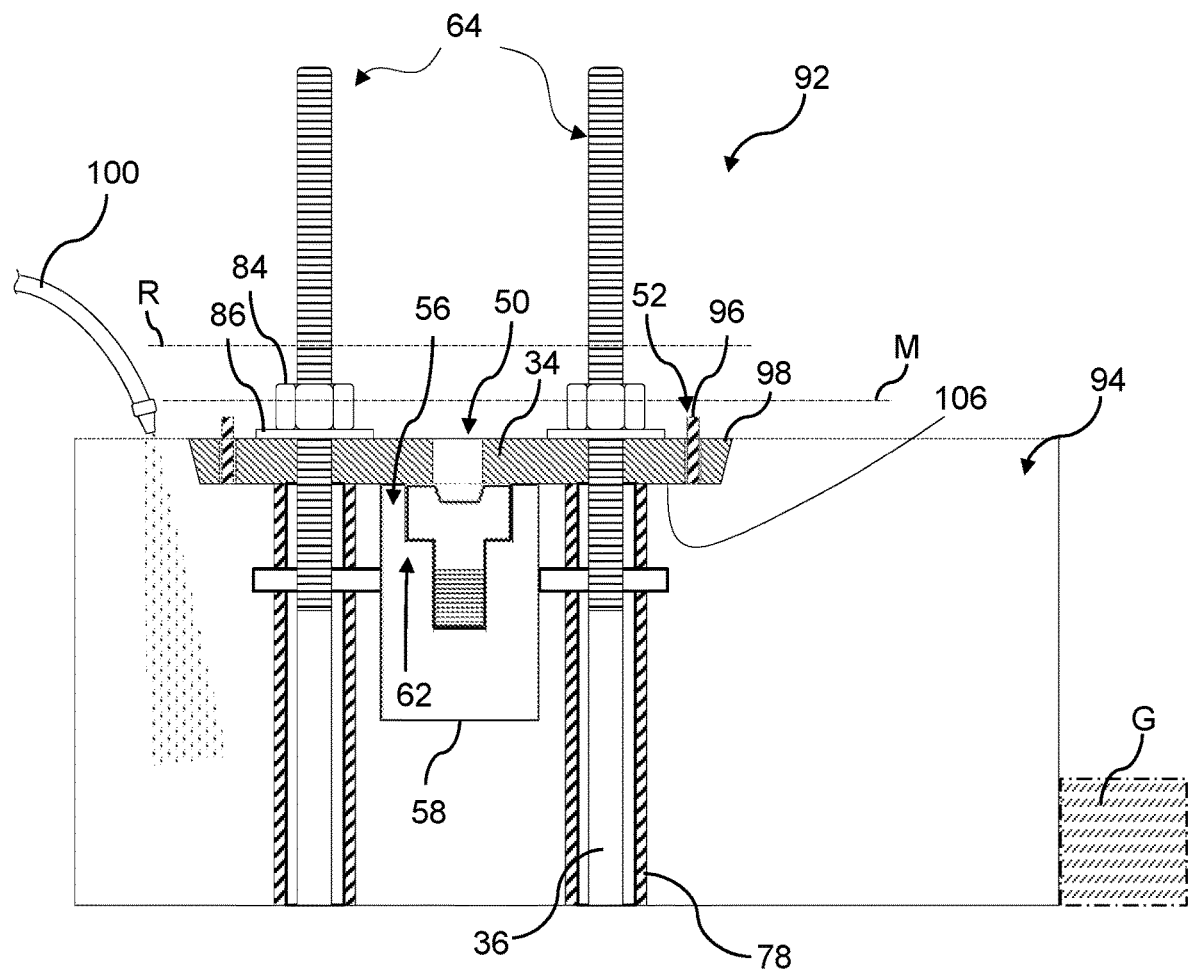
FIG. 8 is an upper radial cross-sectional view of a wind turbine foundation in the process of being formed according to an exemplary embodiment of the invention, showing the delivery of cementitious material into an excavation pit containing the anchor cage of FIG. 2.

Following final positioning of the anchor cage 30 within the excavation pit 94, a cementitious material, such as concrete, is poured into the excavation pit 94 so that the pit fills up to an upper surface 98 of the upper flange 34, as shown in FIG. 8 (FIG. 13—step 124). Accordingly, the anchor cage 30 is substantially embedded within the cementitious material. The poured concrete is then allowed a suitable length of time to adequately cure to form the rigid body 90, as shown in FIGS. 9 to 12. In an exemplary embodiment, the cementitious material may be allowed to cure for approximately 48 hours (FIG. 13—step 126).

A cementitious material delivery device 100, suitable for directing cementitious material into the excavation pit 94, is shown in FIG. 8. The cementitious material delivery device 100 takes the form of a hose which is supplied by a suitable source (not shown) which is arranged to direct the concrete around the anchor cage 30 and into the pit so that the anchor cage 30 becomes embedded within the concrete.

The protective tubes 66 substantially shield the anchor bolts 36, from undesired contact with the cementitious material. Similarly, the levelling apparatus 56 and bore plugs 96 prevents the cementitious material from entering the levelling bore 50 and grouting bores 52, respectively. Prior to pouring the cementitious material, the lower and side surfaces of the upper flange 34 are coated with a lubricant, such as oil or paint for example, to facilitate separation of the upper flange 34 from the rigid body 90 during the subsequent stages of the levelling operation, described below.

As shown in FIG. 8, each of the grouting holes 52 may be fitted with a plug 96, which substantially shield the inner surfaces of the grouting bores 52 from undesired contact with cementitious material during pouring and curing. Advantageously, the levelling hole 50 does not require an additional plug in order to shield it from the potential ingress of cementitious material, since a lower opening of the levelling bore 50 is covered by the levelling apparatus 56, which is arranged adjacently to a lower surface 106 of the upper flange 34. However, in some embodiments the levelling holes 50 are also plugged.

Figure 9:
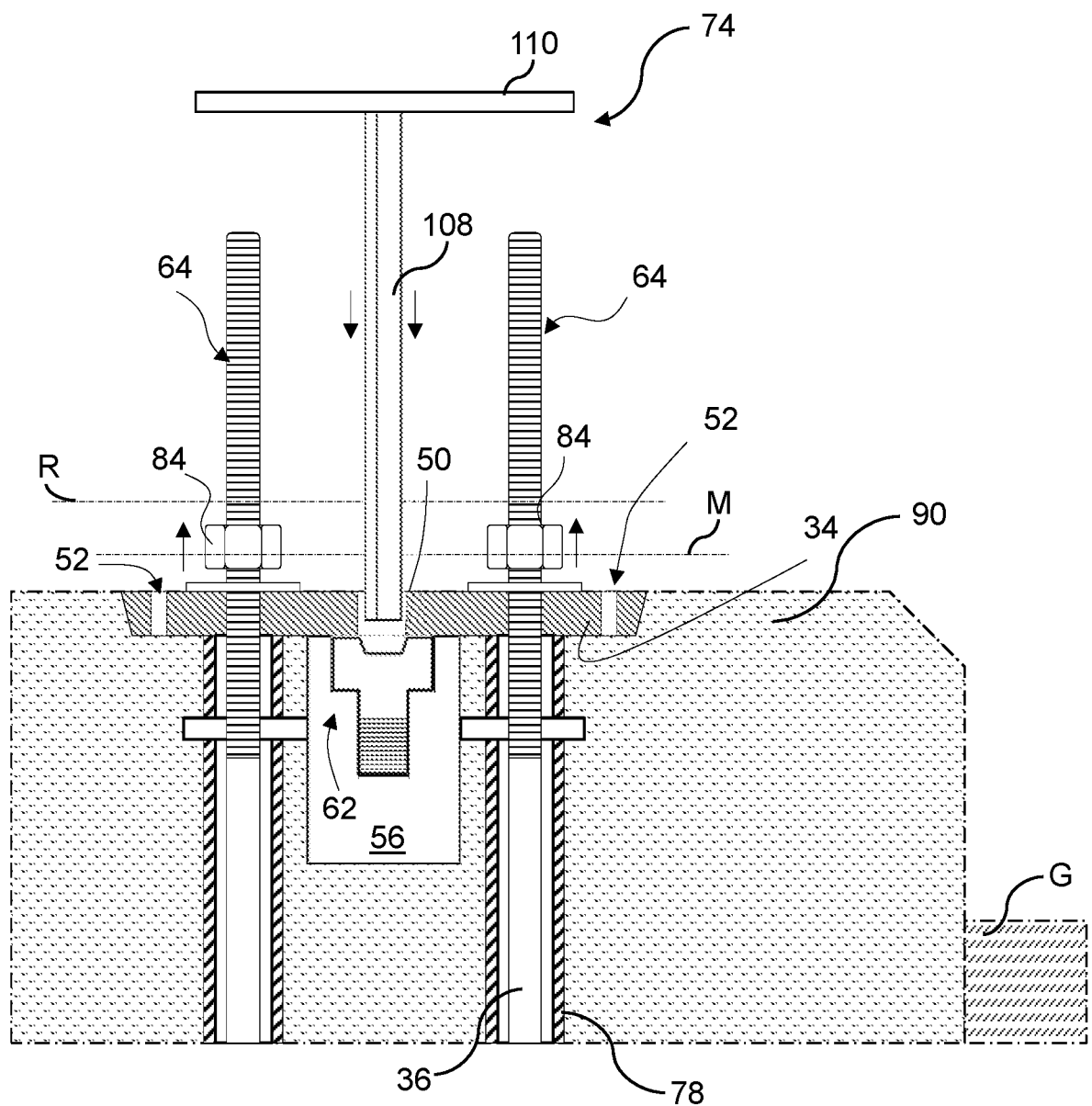
FIG. 9 is an upper radial cross-sectional view similar to FIG. 8, including a rigid body reinforced by the anchor cage of FIG. 2.

The upper flange 34 is evaluated for any degree of slope, relative to horizontal, which must be corrected during the anchor cage levelling process. Next, the height and angular orientation required in order to level the upper flange 34 is determined. The desired height and orientation is defined by a level mounting plane M, as shown in FIGS. 9 to 11, to which the upper flange 34 must be elevated in order to correct the determined slope. In this way, the mounting plane M is determined so as to correct any undesired sloping which may affect the construction of the wind turbine 10. Slope evaluation and the mounting plane determination are typically performed using a laser level, but other known devices may also be used.

The upper flange nuts 84 are then loosened and rotated along their respective anchor bolts 36 to suitable heights relative to the upper surface 98 of the upper flange 34, as illustrated by the movement arrows shown in FIG. 9. The position of the upper flange nuts 84 collectively define a level (horizontal) reference plane R being parallel, but offset, from the level mounting plane M. The reference plane R thereby defines the position that the upper flange nuts 84 will adopt when the upper flange 34 is aligned with the mounting plane M, as shown in FIG. 10. Accordingly, the offset between the reference and mounting planes R, M is chosen based on a corresponding dimension of the upper flange nuts and washers 84, 86.

It will be understood that for installations where the predetermined mounting and reference planes M, R, are sloped relative to the upper surface 98 of the upper flange 34, the upper flange nuts 84 may be positioned at differing heights relative to the upper surface 98 in order to define the level (horizontal) reference plane P. For example, at a given levelling location having a radial pair of upper flange nuts 84, a first upper flange nut 84 may be elevated to a first height and a second upper flange nut 84 may be elevated to a second height. In an exemplary embodiment, each of the upper flange nuts 84 are elevated to a height of approximately 50 mm relative to the highest point of the upper flange 34, and then individually adjusted as necessary to define the level plane P.

The actuating tool 74 is then inserted through the levelling bore 50 to engage with the levelling apparatus 56 arranged underneath the upper flange 34, as shown by the movement arrows shown in FIG. 10. In this embodiment, the actuating tool 74 comprises a rod portion 108 having a hexagonal cross section which engages with the recessed portion 72 of the jacking foot 70. The socket 72 has a matching hexagonal cross section which is configured to receive and engage with the rod portion 108 of the actuating tool 74. Other tool configurations are possible. The actuating tool 74 further comprises a handle 110 attached to the distal end of the rod portion 108. During operation of the levelling apparatus 56, a counter-clockwise rotation of the handle 110 causes the jacking foot 62 to raise the height of the upper flange 34, relative to the rigid body 90. Conversely, a clockwise rotation of the handle 110 leads to the upper flange 34 being lowered back towards the rigid body 90.

It will be appreciated that these components may take various alternative forms and cooperate in various alternative manners suitable for lifting the upper flange 34. In this regard, the actuating tool 74 may take any form suitable for engaging the levelling apparatus 56 to raise the upper flange 34 into the mounting level M. Moreover, while rotation is the primary manner of actuation of the jacking foot 62 disclosed herein, various alternative manners of actuation may be suitably used.

As the actuating tool 74 is rotated in an anti-clockwise direction, as illustrated by the rotating movement arrow in FIG. 10, the jacking foot 62 exerts pressure on the underside of the upper flange 34, thereby raising the upper flange 34 from the rigid body 92 and along the anchor bolts 36, which function as linear guides (FIG. 13—step 128). The actuating tool 74 is further rotated until the upper flange 34 is abutted against the upper flange nuts 84, which remain stationary relative to the anchor bolts 36. The stationary anchor bolts 36 act as a backstop against which the upper flange 34 is tightened to ensure that the upper surface 98 of the upper flange 34 is aligned with the desired mounting plane M.

The upper flange 34 is formed with angled side surfaces 102, 104 which facilitate separation of the upper load distribution flange 34 from the rigid body 90. In particular, the upper flange side surfaces 102, 104 are angled such that the upper flange 34 is formed with larger radial width at its upper surface 98 than at its lower surface.

By elevating the upper flange 34 up to the level mounting plane M during the levelling process a trough 112 is formed in the rigid body 90. As such, the upper flange 34 functions in part as a template for forming the trough 112 in the rigid body 90. In exemplary embodiments, the upper flange 34 may be raised to a level mounting plane M so as to create a trough 112 having a depth in the range of approximately 8 mm to 50 mm, such as approximately 25 mm, for example.

In an equally suitable method, the nuts 84 and washers 84, 86 are removed during the levelling step until assembly of the first tower section. Each levelling apparatus is operated as necessary during the levelling procedure. Measurements of the straightness and level of the upper flange or the position of points on the upper flange relative to a mounting plane M are constantly taken during the levelling procedure.

With reference to FIGS. 11 and 12, a grouting operation performed at the plurality of grouting locations on the upper flange 34 is described according to an exemplary embodiment of the invention. Following levelling of the upper flange 34 described above, and prior to the grouting operation described below, a base tower section 24 of the wind turbine 10 is mounted to the foundation 26, as shown in FIG. 11. The upper flange nuts 84 and washers 86 are removed from the threaded upper ends 46 of the anchor bolts 36 if applicable, before the base tower section 24 is lowered into place on top of the upper flange 34, using the anchor bolts 36 as a guide. Advantageously, the base tower section 24 is supported by the upper flange 34, which in turn, is supported in the levelled position by the levelling apparatus 56, prior to the grout layer being formed beneath the upper flange 34 (FIG. 13—step 130).

The base tower section 24 is coupled to the upper flange 34 by aligning mounting bores 120 of the base tower section 24 with the threaded upper ends 46 of the anchor bolts 36. The base tower section 24 is then lowered until the base tower section 24 directly contacts and is supported by the upper flange 34. The upper flange nuts 84 and washers 86 are then re-applied to the threaded upper ends 46 of the anchor bolts 36 before being tightened with a suitable torque. In this way, the upper flange nuts 84 and washers 86 are ultimately arranged at a non-levelling location and hand-tightened against an upper surface 118 of base tower section 24. The upper flange nuts 84 and washers 86 may be new sets not used during formation of the foundation 26.

Following the installation of the base tower section 24, high strength grout 32 is directed into the trough 112 and cured to form the grout support layer 32 for supporting the upper flange 34 at the level mounting plane M (FIG. 13—step 132). It will be appreciated that various suitable cementitious materials other than grout may be used for forming the support layer 32 in alternative embodiments. For example, a non-cementitious grout such as epoxy may also be used. This would allow the grout trench to be reduced to 2 to 8 mm. The term 'grout' is therefore used to refer to a different material to the primary cementitious material that is used to fill the excavation pit and form the main body of the foundation, whether that grout is cementitious in nature or not, for example an epoxy-based material as mentioned above.

FIG. 12 shows a representative grouting location on the upper flange 34, defined by a pair of the grouting holes 52. It will be understood that the grouting steps described below may be similarly performed at each of the other grouting locations defined by the remaining grouting holes 52, simultaneously or sequentially, for example. Prior to grouting, the plugs 96 fitted in the grouting holes 52 are removed to provide access to the trough 112 via the grouting holes 52. Additionally, water may be directed into the trough 112 for hydrating the grout material which is directed into the trough 112 thereafter.

An exemplary grout delivery apparatus 114, in the form of a pair of hoses, are used for delivering grout into the trough 112 via the grouting holes 52. The grouting holes 52 are arranged so that they are not covered by the base tower section 24 when it is arranged on top of the upper flange 34 during the erection of the wind tower 12. It will be appreciated that the grout delivery apparatus 114 may comprise additional components which are not shown in FIG. 12, such as a grout source and a pump, for example.

The grout which is directed into the trough 112 is allowed a suitable length of time to adequately cure and reach its design strength, such as up to approximately twenty eight days, for example (FIG. 13—step 134). Curing of the grout forms a grout support layer 32 between the rigid body 28 and the levelled upper flange 34. Advantageously, the levelling apparatus 56 supports the upper flange 34 at the level mounting plane M, such that base tower section 24 can be installed on the foundation 26 before the grout support layer 32 is formed. Accordingly, the wind turbine tower 12 can be assembled before the grout has cured, which reduces the time required to assemble the wind turbine 10.

Once the grout support layer 32 has fully cured, the anchor bolts 36 are post-tensioned and maintain the rigid body 28 of the foundation 26 under high compression, thereby enabling the foundation 26 to suitably withstand various forces and moments exerted by the wind turbine 10 during operation. Accordingly, the completed foundation 26 includes a rigid body 28 reinforced by the anchor cage 30 under tension, and a grout support layer 32 that supports a levelled upper flange 34.

It will be appreciated by those skilled in the art that the invention has been described by way of example only, and that a variety of alternative approaches may be adopted without departing from the scope of the invention, as defined by the appended claims.

For example, the grout may be directed into the trough 112 either during or immediately after the levelling of the upper flange 34. In either case, the levelling apparatus 56 is arranged to provide support for upper flange 34 to allow the base tower section 24 to be installed, without having to wait for the grout support layer 32 to cure.

In a further development, the embodiments of the invention may benefit from appropriate means to guard against the formation of stress concentrations in the downward facing surfaces of the levelling apparatus when the anchor bolts are tensioned. Such means may be considered to be a resilient element that cushions selected regions of the levelling apparatus, particularly the underside surfaces thereof. Such a resilient element may be embodied by way of a resilient coating or layer applied directly to appropriate parts of the levelling apparatus, and which may be considered integral with the associated component. For example, this coating could by a polyurethane or nylon that is overmoulded on the underside of the head portion 66 and/or the underside of the jacking body 58 and/or the underside of the support arms 60. Still further, the resilient element could be a separate component such as an annular part e.g. a shim, disc or washer. The positioning of such a resilient element may be appreciated from FIG. 11, which is illustrated schematically and labelled as '99'.

While the present invention has been illustrated by the description of various embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

The invention claimed is:

1. A method of forming a foundation of a wind turbine including a tower having a base tower section, comprising:
   mounting a levelling apparatus to an anchor cage, the anchor cage including a plurality of anchor bolts extending between an upper flange and a lower flange, the levelling apparatus being arranged between the upper and the lower flanges;
   arranging the anchor cage in an excavation pit;
   directing a first cementitious material into the excavation pit so that the upper flange becomes at least partially embedded within the first cementitious material;
   allowing the first cementitious material to cure to form a rigid body;
   actuating the levelling apparatus to raise the upper flange from the rigid body into a levelled position;
   directing a grout material into a space beneath the raised upper flange; and
   allowing the grout material to cure to form a support layer.

2. The method according to claim 1, wherein following the actuation of the levelling apparatus, the method further comprises supporting the base tower section of the wind turbine on the upper flange of the anchor cage.

3. The method according to claim 2, wherein the step of supporting the base tower section of the wind turbine on the raised upper flange occurs before or during the step of directing the grout material into the space beneath the upper flange.

4. The method of claim 3, wherein the step of directing the grout material into the space beneath the upper flange comprises injecting the grout material through an aperture in the upper flange.

5. The method of claim 4, wherein the second aperture is in a position outside a region occupied by the base tower section that is supported on the upper flange.

6. The method according to claim 1, wherein actuating the levelling apparatus comprises engaging the levelling apparatus with an actuating tool.

7. The method according to claim 6, wherein actuating the levelling apparatus comprises inserting the actuating tool through an aperture in the upper flange to engage the levelling apparatus.

8. The method according to claim 6, wherein engaging the levelling apparatus further comprises:
   engaging the actuating tool with a jacking foot of the levelling apparatus, and rotating the jacking foot with respect to the jacking body to raise the upper flange away from the jacking body.

9. The method according to claim 1, wherein mounting the levelling apparatus to the anchor cage comprises mounting the levelling apparatus to at least one anchor bolt.

10. The method according to claim 9, comprising mounting the levelling apparatus to the at least one anchor bolt before installing at least one of the upper and lower flanges onto the at least one anchor bolt.

11. The method according to claim 9, comprising arranging the levelling apparatus to abut an underside of the upper flange before directing the first cementitious material into the excavation pit.

12. The method according to claim 1, wherein the step of directing the grout material beneath the upper flange is performed concurrently with the step of actuating the levelling apparatus to raise the upper flange into the levelled position.

13. An anchor cage arrangement for forming a wind turbine foundation, comprising:
   an upper flange, a lower flange, and a plurality of anchor bolts extending between the upper and lower flanges through a plurality of respective anchor bolt apertures; and
   a levelling apparatus arranged between the upper and the lower flanges, the levelling apparatus comprising a jacking body which is fixedly coupled to at least one anchor bolt and a jacking foot arranged to raise the upper flange away from the lower flange,
   wherein the upper flange comprises at least one tool aperture arranged to accommodate a respective actuating tool inserted therethrough to actuate the levelling apparatus.

14. The anchor cage arrangement according to claim 13, wherein the jacking foot is engaged with a threaded bore of the jacking body, the jacking foot being configured to rotate with respect to the jacking body to raise the upper flange away from the jacking body.

15. The anchor cage arrangement according to claim 13, wherein the upper flange comprises at least one delivery aperture arranged to allow a grout material to be delivered into the space beneath the upper flange, wherein the at least one delivery aperture is located at a position on the upper flange that is radially spaced from a circumferential region defined by the plurality of anchor bolt apertures.

16. The anchor cage arrangement according to claim 13, wherein the anchor bolts are arranged in two or more arced rows across at least a portion of the upper flange and wherein the levelling apparatus is arranged between two radially aligned anchor bolts.

17. A system for forming a wind turbine foundation comprising:
   at least one anchor cage arrangement according to claim 13, and
   an actuating tool configured to be inserted through a bore in the upper flange to engage with the levelling apparatus to raise the upper flange away from the lower flange.

18. An anchor cage arrangement for forming a wind turbine foundation, comprising:
   an upper flange, a lower flange, and a plurality of anchor bolts extending between the upper and lower flanges through a plurality of respective anchor bolt apertures; and
   a levelling apparatus arranged between the upper and the lower flanges, the levelling apparatus comprising a jacking body which is fixedly coupled to at least one anchor bolt and a jacking foot spaced from the at least one anchor bolt and arranged to raise the upper flange away from the lower flange.

19. The anchor cage arrangement according to claim 18, wherein the upper flange comprises at least one tool aperture arranged to accommodate a respective actuating tool inserted therethrough to actuate the levelling apparatus.

20. The anchor cage arrangement according to claim 18, wherein the upper flange comprises at least one delivery aperture arranged to allow a grout material to be delivered into the space beneath the upper flange, wherein the at least one delivery aperture is located at a position on the upper flange that is radially spaced from a circumferential region defined by the plurality of anchor bolt apertures.

\* \* \* \* \*